(No Model.) 2 Sheets—Sheet 1.
E. H. BARNES.
GANG EDGER.
No. 336,782. Patented Feb. 23, 1886.
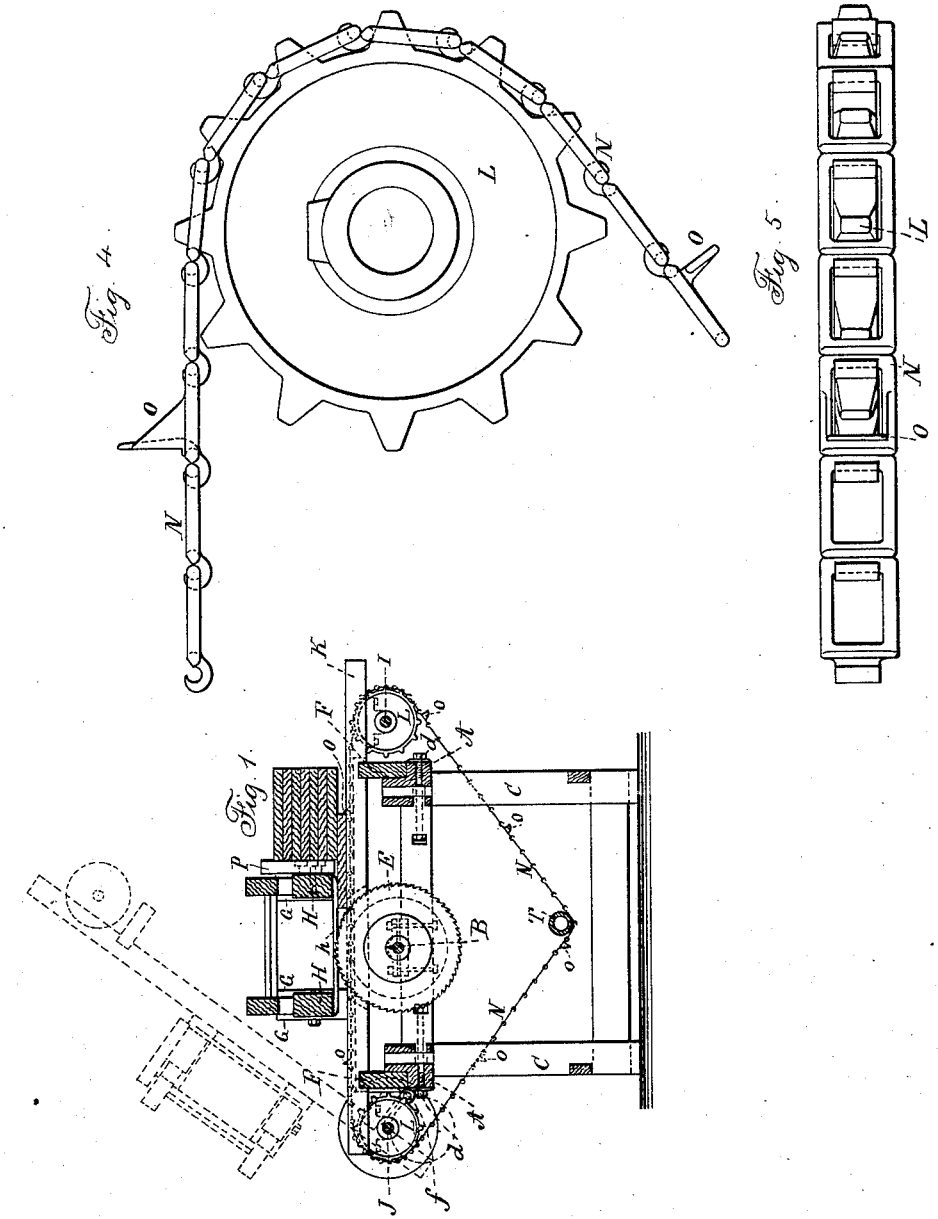
Witnesses
J. Staib
Chas. H. Smith
Inventor:
Erastus H. Barnes
per Lemuel W. Serrell
Atty

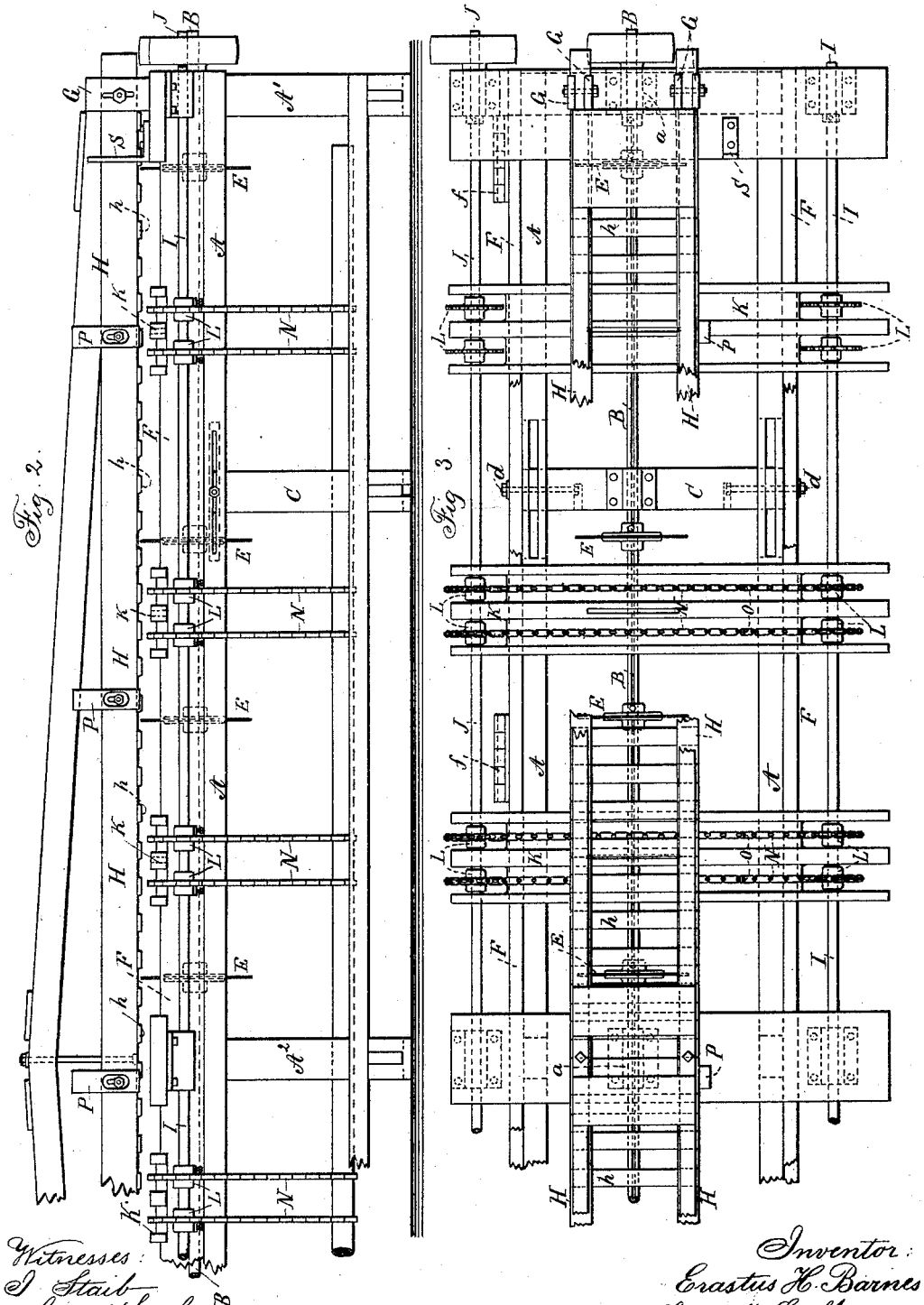

UNITED STATES PATENT OFFICE.

ERASTUS H. BARNES, OF BROOKLYN, NEW YORK.

GANG-EDGER.

SPECIFICATION forming part of Letters Patent No. 336,782, dated February 23, 1886.

Application filed October 12, 1885. Serial No. 179,621. (No model.)

*To all whom it may concern:*

Be it known that I, ERASTUS H. BARNES, of Brooklyn, in the county of Kings and State of New York, have invented an Improvement in Gang Crosscut Sawing Machines, of which the following is a specification.

Machines have heretofore been made with a gang of circular saws upon a revolving shaft, the saws being adjustable on such shaft, and adapted to sawing the edges of boards in trimming the same, and lumber-trimming machines have been made with separate circular saws in frames that can be raised or lowered for sawing off the ends of boards of different lengths, and in these machines chains have been employed for moving the board laterally while the same is being sawed.

My improvements are especially adapted to sawing boards into lengths for boxes, and I make use of a revolving shaft, upon which are circular saws that can be adjusted to the desired distances apart, and this revolving shaft is supported in bearings, some of which are movable in the main frame of the machine, in order that such bearings may not interfere with the adjustment of the saws, and I provide a hinged bed with movable bearing-pieces, upon which the board to be sawed can be laid, and I use feeding chains or belts driven by a shaft and sprocket-wheels, by which the board is carried bodily and laterally beneath a headpiece, that prevents the board rising by the action of the saws, and there are upon the head-piece movable gages, beneath which the board to be sawed passes, and these gages hold back all the boards in the pile of boards, except the bottom one, which rests upon the bed and is carried off laterally to the saws, as aforesaid.

In the drawings, Figure 1 is a cross-section of the machine. Fig. 2 is an elevation of the machine. Fig. 3 is a plan view with portions of the head-piece and bed removed to show the main frame and movable bearings; and Figs. 4 and 5 show the sprocket wheel and chain in larger size.

The main frame A of the machine is of any desired material, and it is longer than the longest boards that are to be sawed upon the machine. Said main frame is provided with end cross-bearers, A', and a central cross-bearer, $A^2$, for the journal-boxes $a$ of the main shaft B, and there are movable cross-bearers C between the longitudinal sills of the frame A, which cross-bearers C support the main shaft B at intermediate places. The longitudinal sills of the main frame A are slotted horizontally for the reception of the ends of the movable cross-bearers C, and there are bolts $d$ passing through the main frame A and holding the movable cross-bearers C in any position to which they may be moved along and at right angles to the main shaft B, so that such movable cross-bearers may be placed in the desired positions out of the way of the saws E upon said shaft B. The shaft B is rotated by pulleys and belts, and it is preferable to place a pulley at each end of the shaft, outside the main frame A, and to bring the belt up through the floor and over such pulleys, and this shaft B is to be provided with a longitudinal key seat or groove, and the circular saws are received between pairs of clamping-disks, the hubs of which receive through them the shaft B, so that the saws and their disks may be moved freely endwise of the shaft B and held by a clamping-screw through the hub of each saw, that presses upon the shaft, and the clamping-disks have key-seats through their hubs receiving keys that fit the groove in the shaft B, so that such saws are revolved by the shaft B, but can be adjusted to the required distances apart for sawing off the different lengths of board in making boxes and similar articles. I remark that by making the keys longer than the hubs the ends of the keys may be turned up at the ends of the hubs, so that the keys are moved by and with the hubs and saws when the latter are being adjusted.

The journal-boxes $a$ may be of any desired character adapted to receive the shaft B, and this shaft B should be of uniform size throughout, and it is kept in position endwise by collars with clamping-screws, said collars being adjacent to the ends of the journal-boxes $a$. By this construction I am enabled to remove the saws with rapidity for sharpening the same, and this may be done by taking off the caps of the journal-boxes $a$ and removing the shaft and saws bodily and introducing another shaft with saws upon it; or the clamping-screws may be slackened and the shaft drawn out endwise, and then other saws slipped upon the shaft as it is moved endwise back to place.

It is preferable in adjusting the saws to first set those saws that are adjacent to the central bearing, and then to set the other saws at the proper distances apart, because the movable cross-bearers C between the central cross-bearer and the ends of the main frame are capable of adjustment to a greater extent than their own width, and hence can be moved to a position to accommodate the contiguous saws.

Above the main frame A is a hinged bed-frame F, the hinges $f$ being at suitable distances apart to connect said bed-frame F to the main frame A, and to allow the former to be swung up to the position indicated in Fig. 1 by dotted lines, to give access to the saws.

At the end portions of the hinged bed-frame F are vertical supports G for a head-piece, H. This head piece H is preferably in the form of a skeleton girder, as represented, so as to obtain the necessary strength and lightness. This head-piece may be made of either wood or metal, and its under surface is provided with transverse presser-boards $h$, beneath which the board to be sawed is passed, and these hold down the board against any lifting action of the saws, and these presser-boards should be of wood, so as not to injure the saws should the latter touch the same.

The hinged bed-frame F is provided with movable transverse bed-pieces K, the under surfaces of which are notched to set over the longitudinal pieces of the hinged frame F, and these bed-pieces can be moved laterally and endwise of the frame F, so as to occupy the proper relative positions between the saws, and the boards to be sawed rest upon the transverse bed-pieces K, usually in a pile, and one board at a time is carried off laterally beneath the head-piece H and sawed up into lengths. The devices for moving the board laterally are next described.

Upon the hinged bed-frame F, at the front and back edges of the same, are journal-boxes receiving the shafts I and J, upon which are movable sprocket-wheels L, adapted to and receiving the feeding-chains N, upon which, at suitable distances apart, are the feeding-dogs O. The chains and dogs may be of any desired character. I have represented the links as rectangular, with openings adapted to the teeth of the sprocket-wheel, and the feeding-dogs O should be of a less height than the thickness of the thinnest lumber to be sawed. The sprocket-wheels are adjustable endwise of their respective shafts, and should be secured by clamping screws or keys when in position.

It is preferable to place one of the movable transverse bed-pieces between each two saws, and to provide a feeding-chain to each bed-piece, the upper surface of such transverse bed-piece being grooved for the reception of the chain, as shown, so that the lumber may not rest upon the chains themselves, and there may be movable transverse bed-pieces without either grooves or feeding-chains for supporting the lumber, especially where the pieces sawed off are comparatively long. It is now to be understood that after the saws are properly set the hinged bed F is lowered, the movable transverse bed pieces K are placed in their proper position in relation to the saws, and then the sprocket-wheels L are adjusted to the proper position upon the shafts, and the feeding-chains N are connected up with the feeding-dogs O, in line with each other, so that the board will be carried by such dogs laterally and at right angles to the saws through beneath the head-pieces H, and sawed up into lengths, and pushed off the bed, and fall into a pile.

It is preferable to apply to the front face of the head-piece H slotted gages P, that are adjustable vertically, and are held in position by screws passing through the slots into the head-piece. These gages are set so that their lower ends are at a slightly greater distance from the transverse bed-pieces K than the thickness of the boards. This allows the attendant to pack up in a pile the lumber to be sawed up, and each range of dogs as the feeding-chains revolve carries off the bottom board in the pile of lumber, and conveys the same through beneath the head-piece H while being sawed up into lengths.

A gage, S, may be applied, against which the ends of the boards in the pile may be brought into contact.

It is preferable to employ feeding-chains N, that are sufficiently long to hang down loosely beneath the saws and their shaft, as indicated in Fig. 1, and by placing one or more round tubes or bars, T, beneath the bed and resting upon the chains, such chains will be kept in position in a reliable manner, and their movement will not be interfered with. These feeding chains being slack can be easily unhooked, so as to be out of the way when the hinged bed-frame F is raised to give access to the saws and hooks upon the main frame A, and movable bed-pieces K are by preference provided so that the loose ends of the chains may be held in their proper positions while the saws are being changed.

I usually place the transverse bed-pieces K in such positions upon the frame F with reference to the saws that such saws are within the slots provided for them in the middle of each transverse bed, so that the feeding-chains act adjacent to and at each side of each saw.

I claim as my invention—

1. The combination, with a saw-shaft, its frame, journal-boxes, and adjustable gang of saws, of a hinged bed-frame, movable transverse bed-pieces, and a stationary head-piece beneath which the boards to be sawed are moved laterally, substantially as set forth.

2. The combination, with a gang of adjustable saws, their shaft and bearings, of a bed-frame, movable transverse bed-pieces, sprocket-wheels and shaft, and feeding-chains with dogs for supporting and moving a board while being sawed transversely into lengths, substantially as set forth.

3. The combination, with a gang of saws and their shaft, of a hinged bed-frame, movable transverse bed-pieces, sprocket-wheels and their shafts supported upon the hinged bed-frame, the sprocket-wheels being adjustable longitudinally of the shaft, and feeding chains and dogs, substantially as set forth.

4. In a machine for sawing boards transversely, the combination, with a saw-shaft and the gang of adjustable saws, of a hinged bed-frame, movable transverse bed-pieces, feeding-chains and dogs, sprocket-wheels and their shafts supported on the hinged bed-frame, the head-piece extending along above the saws, and the supports upon the hinged bed-frame, to which the head-piece is movably connected, substantially as set forth.

5. The gang of saws and the shaft for the same, a supporting-frame, and journal-boxes for the saw-shaft, a bed-frame hinged to the supporting-frame, movable transverse bed-pieces resting upon the bed-frame, sprocket-wheels and shafts supported by the bed-frame, and feeding chains and dogs, a head-piece above the bed-frame, and supports for the same, and movable gages attached to the head-pieces, substantially as and for the purposes set forth.

Signed by me this 2d day of October, A. D. 1885.

ERASTUS H. BARNES.

Witnesses:
WALLACE L. SERRELL,
WILLIAM G. MOTT.